(12) United States Patent
Zhang et al.

(10) Patent No.: US 12,296,871 B2
(45) Date of Patent: May 13, 2025

(54) AUTOMATIC TRAIN TRACKING METHOD AND AUTOMATIC TRAIN TRACKING SYSTEM

(71) Applicant: CRSC COMMUNICATION & INFORMATION GROUP COMPANY LTD., Beijing (CN)

(72) Inventors: Chenxing Zhang, Beijing (CN); Jie Di, Beijing (CN); Xiangbin Kong, Beijing (CN)

(73) Assignee: CRSC COMMUNICATION & INFORMATION GROUP COMPANY LTD., Beijing (CN)

( * ) Notice: Subject to any disclaimer, the term of this patent is extended or adjusted under 35 U.S.C. 154(b) by 119 days.

(21) Appl. No.: 18/024,422

(22) PCT Filed: Sep. 30, 2021

(86) PCT No.: PCT/CN2021/122238
§ 371 (c)(1),
(2) Date: Mar. 2, 2023

(87) PCT Pub. No.: WO2022/193619
PCT Pub. Date: Sep. 22, 2022

(65) Prior Publication Data
US 2023/0365174 A1    Nov. 16, 2023

(30) Foreign Application Priority Data

Mar. 19, 2021    (CN) .......................... 202110294137.2

(51) Int. Cl.
*B61L 25/02*    (2006.01)
*G06V 20/52*    (2022.01)

(52) U.S. Cl.
CPC .............. *B61L 25/02* (2013.01); *G06V 20/52* (2022.01)

(58) Field of Classification Search
CPC ........ B61L 25/02; G06V 20/52; G06V 20/42; H04M 7/181; G01C 11/04
See application file for complete search history.

(56) References Cited

U.S. PATENT DOCUMENTS

| 6,064,428 A | 5/2000 | Trosino et al. |
| 11,036,240 B1 * | 6/2021 | Irschara ................. G01C 21/16 |

(Continued)

FOREIGN PATENT DOCUMENTS

| CN | 101020466 A | 8/2007 |
| CN | 102622908 A | 8/2012 |

(Continued)

OTHER PUBLICATIONS

WIPO, International Search Report issued on Dec. 23, 2021.

(Continued)

*Primary Examiner* — George C Jin
(74) *Attorney, Agent, or Firm* — Li & Cai Intellectual Property (USA) Office

(57) ABSTRACT

Provided is an automatic train tracking method, including: acquiring and displaying a real-time video image captured by a current image capture device (S101); wherein a plurality of image capture devices are sequentially arranged beforehand in a traveling direction of a train on a traveling route; detecting, based on the real-time video image, whether the train currently enters a capture range of the current image capture device (S102); taking, when it is detected that the train enters the capture range of the current image capture device, a next image capture device as the current image capture device (S103), returning to the step of acquiring and displaying a real-time video image captured by the current image capture device (S101), wherein the next image capture device is an image capture device adjacent to (Continued)

the current image capture device in the traveling direction. Further disclosed is an automatic train tracking system.

12 Claims, 2 Drawing Sheets

(56) References Cited

U.S. PATENT DOCUMENTS

| | | | | |
|---|---|---|---|---|
| 2015/0008294 | A1* | 1/2015 | Desbordes | G06T 7/20 |
| | | | | 246/122 R |
| 2018/0354535 | A1* | 12/2018 | Cho | B61L 27/04 |
| 2022/0004770 | A1* | 1/2022 | Lei | G06V 10/809 |
| 2022/0024503 | A1* | 1/2022 | Vrba | G06V 20/52 |

FOREIGN PATENT DOCUMENTS

| | | |
|---|---|---|
| CN | 103733077 A | 4/2014 |
| CN | 103886769 A | 6/2014 |
| CN | 104401369 A | 3/2015 |
| CN | 104506794 A | 4/2015 |
| CN | 104590319 A | 5/2015 |
| CN | 105847755 A | 8/2016 |
| CN | 106878667 A | 6/2017 |
| CN | 108234927 A | 6/2018 |
| CN | 109766919 A | 5/2019 |
| CN | 111717243 A | 9/2020 |
| CN | 111741273 A | 10/2020 |
| CN | 111818313 A | 10/2020 |
| CN | 112380902 A | 2/2021 |
| CN | 112706805 A | 4/2021 |
| CN | 113002595 A | 6/2021 |
| CN | 113895481 A | 1/2022 |
| WO | 2020058215 A1 | 3/2020 |

OTHER PUBLICATIONS

China Patent Office, First Office Action issued Oct. 19, 2022 for application No. CN202110294137.2.
China Patent Office, Second Office Action issued Apr. 12, 2023 for application No. CN202110294137.2.
China Patent Office, Notification of Grant issued Jul. 26, 2023 for application No. CN202110294137.2.

* cited by examiner

AUTOMATIC TRAIN TRACKING METHOD AND AUTOMATIC TRAIN TRACKING SYSTEM

TECHNICAL FIELD

The present disclosure relates to the field of video image processing, and specifically relates to an automatic train tracking method and an automatic train tracking system.

BACKGROUND

The railway comprehensive video monitoring system is a large-scale networked system covering work areas, station sections and companies along the line, and has the application characteristics of large spatial coverage and all-weather time. With the development of railway transportation, the video monitoring system has increasingly remarkable functions on transportation command, public security, production operation, safety monitoring and the like. Meanwhile, various railway information systems have more and more urgent demands on video monitoring, and in railway security, there are application requirements on video monitoring and tracking of high-speed trains carrying participants of some important conferences, activities and the like to guarantee safety travel of them.

In the existing train operation and control system, the train tracking function is mainly applied into a scheduling and maintenance system. According to an operation plan, the scheduling and maintenance system may determine an operation time of the train entering the railway track, and a train corresponding to an occupation state acquired by a ground train position signal acquisition device, and then, by performing manual confirmation on a human-computer interaction interface, the scheduling and maintenance system determines a specific train position for the first time. As the train runs, states of physical sections that the train passed through are continuously changed, and after a preceding physical section is occupied, a next physical section is also occupied as the train enters the next physical section. The scheduling and maintenance system completes a first positioning of the train according to the operation plan and the manual confirmation, and then implementing tracking of the train position according to continuous transmission of the occupation state.

However, for the train operation monitoring and command system, since the system is a command system that requires real-time video images of the train in operation, and as less random manual intervention as possible, the train tracking method by the above scheduling and maintenance system cannot well adapt to the train operation monitoring and command system.

SUMMARY

In view of the above problems, an object of the present disclosure is to provide an automatic train tracking method and an automatic train tracking system which can implement automatic tracking of a train and improve the accuracy of train tracking.

To achieve the above object, a first aspect of the present disclosure provides an automatic train tracking method, including: acquiring and displaying a real-time video image captured by a current image capture device; wherein a plurality of image capture devices are sequentially arranged beforehand in a traveling direction of a train on a traveling route corresponding to the train, and the current image capture device is one of the plurality of image capture devices; detecting, based on the real-time video image, whether the train currently enters a capture range of the current image capture device; and taking, when it is detected that the train enters the capture range of the current image capture device, a next image capture device as the current image capture device, and returning to the step of acquiring and displaying a real-time video image captured by the current image capture device, wherein the next image capture device is an image capture device adjacent to the current image capture device in the traveling direction.

Optionally, before acquiring and displaying the real-time video image captured by the current image capture device, the automatic train tracking method further includes: acquiring device information of each image capture device sequentially arranged in the traveling direction of the train on the traveling route, wherein the device information includes a device ID (device identification) of the image capture device, and position information of the image capture device on the traveling route; generating image capture device sequence information based on the device information of each image capture device, wherein the image capture device sequence information includes a sequence of the image capture devices in which the train is expected to pass by according to the traveling route; and taking an image capture device ranking first in the image capture device sequence information as the current image capture device.

Optionally, before taking the next image capture device as the current image capture device, the automatic train tracking method further includes: determining, based on the image capture device sequence information, an image capture device ranking after and adjacent to the current image capture device as the next image capture device.

Optionally, the step of detecting, based on the real-time video image, whether the train currently enters the capture range of the current image capture device includes: detecting the real-time video image through a Single Shot Multibox Detector (SSD) algorithm to determine whether the train currently enters the capture range of the current image capture device.

Optionally, the automatic train tracking method further includes: displaying, when it is detected that the train enters the capture range of the current image capture device, a detection result based on the real-time video image in real time.

Optionally, the step of acquiring and displaying a real-time video image captured by the current image capture device includes: acquiring, based on pre-acquired device information of the current image capture device, the real-time video image captured by the current image capture device; and performing format conversion on the real-time video image, and displaying the converted real-time video image.

A second aspect of the present disclosure provides an automatic train tracking system, including: a first acquisition unit configured to acquire a real-time video image captured by a current image capture device; wherein a plurality of image capture devices are sequentially arranged beforehand in a traveling direction of a train on a traveling route corresponding to the train, and the current image capture device is one of the plurality of image capture devices; a display unit configured to display the real-time video image captured by the current image capture device; a train identification unit configured to detect, based on the real-time video image, whether the train currently enters a capture range of the current image capture device; and a configuration processing unit configured to configure, when the train identification unit detects that the train enters the capture range of the current image capture device, a next image capture device as the current image capture device, and configure to return to the step of the first acquisition unit acquiring a real-time video image captured by the current image capture device, wherein the next image capture device is an image capture device adjacent to the current image capture device in the traveling direction.

Optionally, the automatic train tracking system further includes: a second acquisition unit; the second acquisition unit is configured to acquire device information of each image capture device sequentially arranged in the traveling direction of the train on the traveling route, wherein the device information includes a device ID of the image capture device, and position information of the image capture device on the traveling route; the configuration processing unit is further configured to generate image capture device sequence information based on the device information of each image capture device, wherein the image capture device sequence information includes a sequence of the image capture devices in which the train is expected to pass by according to the traveling route; and is further configured to take an image capture device ranking first in the image capture device sequence information as the current image capture device.

Optionally, the configuration processing unit is further configured to configure, based on the image capture device sequence information, an image capture device ranking after and adjacent to the current image capture device as the next image capture device.

Optionally, the train identification unit is configured to detect the real-time video image through a Single Shot Multibox Detector algorithm to determine whether the train currently enters the capture range of the current image capture device.

Optionally, the display unit is configured to display, when it is detected that the train enters the capture range of the current image capture device, a detection result based on the real-time video image in real time.

Optionally, the automatic train tracking system further includes a decoding unit; the first acquisition unit is configured to acquire, based on pre-acquired device information of the current image capture device, the real-time video image captured by the current image capture device; and the decoding unit is configured to perform format conversion on the real-time video image; and the display unit is configured to display the converted real-time video image.

The present disclosure provides an automatic train tracking method and an automatic train tracking system. The method includes: acquiring and displaying a real-time video image captured by a current image capture device; wherein a plurality of image capture devices are sequentially arranged beforehand in a traveling direction of a train on a traveling route corresponding to the train, and the current image capture device is one of the plurality of image capture devices; detecting, based on the real-time video image, whether the train currently enters a capture range of the current image capture device; and taking, when it is detected that the train enters the capture range of the current image capture device, a next image capture device as the current image capture device, and returning to the step of acquiring and displaying a real-time video image captured by the current image capture device, wherein the next image capture device is an image capture device adjacent to the current image capture device in the traveling direction. With the present disclosure, the real-time video image captured by an image capture device that a train is about to pass by or is passing by can be intelligently displayed, automatic tracking of the train can be implemented, and the accuracy of train tracking can be improved.

DETAIL DESCRIPTION OF EMBODIMENTS

The present disclosure will be described in detail below with reference to the accompanying drawings. It is to be understood, however, that the drawings are provided for the sole purpose of providing a better understanding of the present disclosure, and are not to be considered as limiting the present disclosure.

Embodiments of the present disclosure and features thereof may be combined with each other as long as they are not contradictory.

As used herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof. The terms "connected" or "coupled" and the like are not restricted to physical or mechanical connections, but may include electrical connections, whether direct or indirect.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

Figure 1:
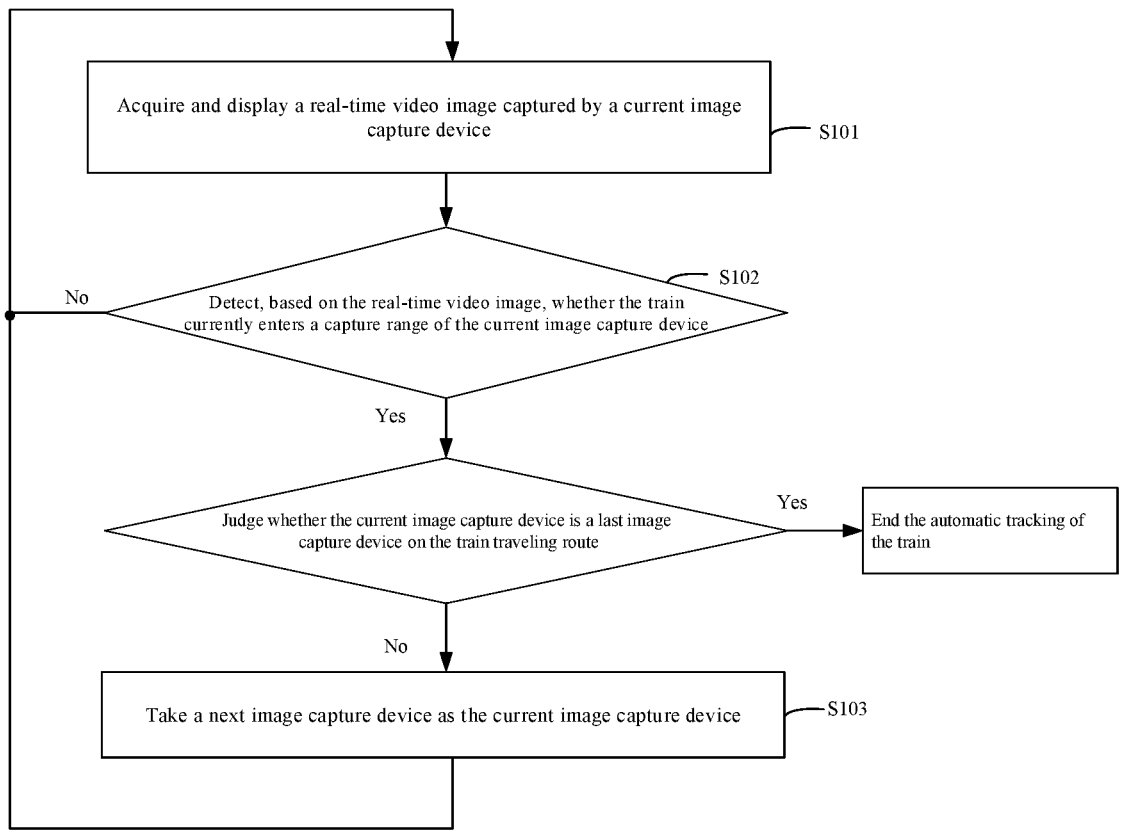
FIG. 1 is a flowchart of an automatic train tracking method according to an embodiment of the present disclosure.

FIG. 1 is a flowchart of an automatic train tracking method according to an embodiment of the present disclosure, which is applied to an automatic train tracking system. As shown in FIG. 1, the automatic train tracking method includes: the following steps S101 to S103.

At step S101, acquiring and displaying a real-time video image captured by a current image capture device.

A plurality of image capture devices are sequentially arranged beforehand in a traveling direction of a train on a traveling route corresponding to the train, and each image capture device captures real-time video images of a corresponding capture section in real time. The current image capture device is one of the plurality of image capture devices. The image capture device may be a camera.

Figure 2:
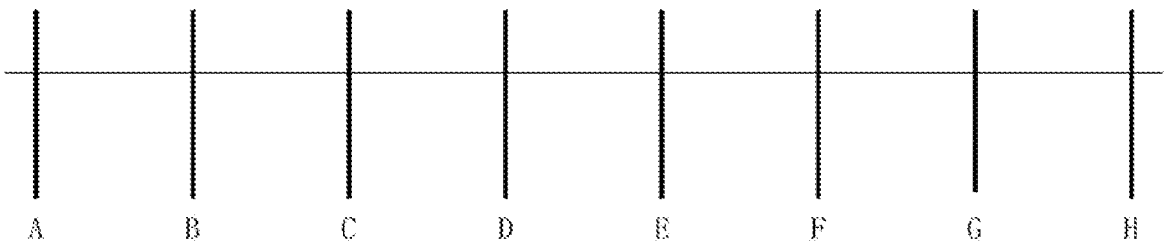
FIG. 2 is a schematic distribution diagram of image capture devices according to an embodiment of the present disclosure.

FIG. 2 is a schematic distribution diagram of image capture devices according to an embodiment of the present disclosure. In an implementation, as shown in FIG. 2, when a plurality of image capture devices are sequentially arranged beforehand in a traveling direction of a train on a traveling route corresponding to the train, the plurality of image capture devices (e.g., A to H in FIG. 2) may be arranged at regular intervals, where a first image capture device may be disposed at a train starting position on the traveling route of the train, and a last image capture device may be disposed at a train terminal position on the traveling route of the train. A distance between any two image capture devices may be reasonably set according to the actual requirements and the energy consumption. For example, the distance between any two image capture devices is prevented to be too small to cause overlarge energy consumption of the system supporting automatic train tracking, and the distance between any two image capture devices is prevented to be too large to cause automatic train tracking inefficiency.

In an implementation, the step of acquiring the real-time video image captured by the current image capture device includes: acquiring, based on pre-acquired device information of the current image capture device, the real-time video image captured by the current image capture device.

The device information includes a device ID of the image capture device, and position information of the image capture device on the traveling route. The position information of the image capture device on the traveling route may be a kilometer post, which may be used to indicate a distance of the image capture device from a reference position which may be, for example, the train starting position on the traveling route of the train.

In an implementation, in order to optimize the display effect, the step of displaying the real-time video image captured by the current image capture device includes: performing format conversion on the real-time video image, and displaying the converted real-time video image, to improve sharpness of the displayed real-time video image. The format conversion of the real-time video image may be based on a preset decoding mode. The preset decoding mode may be set according to an image format of the real-time video image, which is not particularly limited herein.

It should be noted that, in order to meet requirements of various scenarios, in the step of displaying the real-time video image captured by the current image capture device, the real-time video image which is not subjected to format conversion and the real-time video image which is subjected to the format conversion may be displayed on different display units, respectively.

At step S102, detecting, based on the real-time video image, whether the train currently enters a capture range of the current image capture device.

In an implementation, the step of detecting, based on the real-time video image, whether the train currently enters the capture range of the current image capture device includes: detecting the real-time video image through a Single Shot Multibox Detector (SSD) algorithm, to determine whether the train currently enters the capture range of the current image capture device.

For example, the SSD algorithm is used to detect whether a locomotive image information corresponding to the train is present in the real-time video image, so as to determine whether the train currently enters the capture range of the current image capture device. When the locomotive image information corresponding to the train is detected in the real-time video image, it is determined that the train currently enters the capture range of the current image capture device; and when the locomotive image information corresponding to the train is not detected in the real-time video image, it is determined that the train does not enter the capture range of the current image capture device currently.

In an implementation, when it is detected that the train does not enter the capture range of the current image capture device, the step of detecting, based on the acquired real-time video image, whether the train currently enters the capture range of the current image capture device is continue to be performed, until it is detected that the train currently enters the capture range of the current image capture device.

In an implementation, when it is detected that the train enters the capture range of the current image capture device, a detection result based on the real-time video image is displayed in real time. The detection result may be used to remind a worker that the train has entered the capture range of the current image capture device, that is, the train has reached a region where the current image capture device is located.

At step S103, taking, when it is detected that the train enters the capture range of the current image capture device, a next image capture device as the current image capture device, and returning to the step of acquiring and displaying a real-time video image captured by the current image capture device.

The next image capture device is an image capture device adjacent to the current image capture device in the traveling direction of the train.

In an implementation, when it is detected that the train enters the capture range of the current image capture device, before taking the next image capture device as the current image capture device, it is judged whether the current image capture device is the last image capture device on the train traveling route, and if the current image capture device is the last image capture device on the train traveling route, the automatic tracking of the train is ended.

In an implementation, after taking the next image capture device as the current image capture device, and returning to the step of acquiring and displaying a real-time video image captured by the current image capture device, the real-time video image captured by the original image capture device may be continuously displayed, or displayed until a preset time period elapses, or displayed until it is detected that the train has passed through the capture range of the original image capture device.

Figure 3:
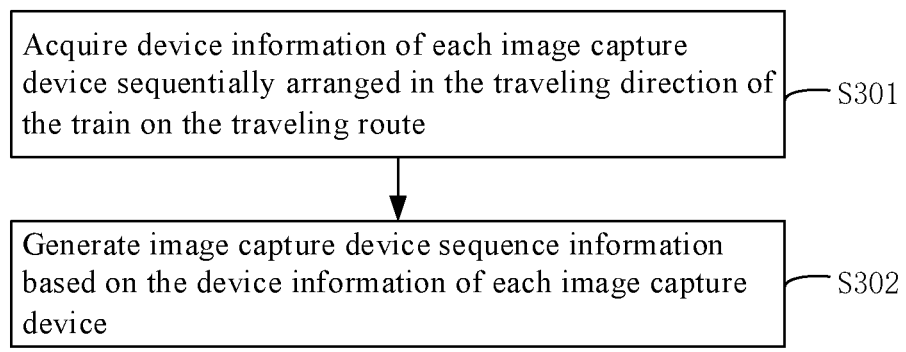
FIG. 3 is a flowchart of another automatic train tracking method according to an embodiment of the present disclosure.

FIG. 3 is a flowchart of another automatic train tracking method according to an embodiment of the present disclosure. In an implementation, before acquiring and displaying the real-time video image captured by the current image capture device (S101), as shown in FIG. 3, the automatic train tracking method further includes steps S301 to S303.

At step S301, acquiring device information of each image capture device sequentially arranged in the traveling direction of the train on the traveling route.

The device information includes a device ID of the image capture device, and position information of the image capture device on the traveling route. The position information of the image capture device on the traveling route may be a kilometer post. For example, the reference position may be a train starting position, and the position information of an image capture device at the train starting position is 0 kilometer on the traveling route, and the position information of an image capture device 30 kilometers away from the train starting position along the traveling route of the train is 30 kilometers on the traveling route.

At step S302, generating image capture device sequence information based on the device information of each image capture device.

The image capture device sequence information includes a sequence of the image capture devices in which the train is expected to pass by according to the traveling route.

In an implementation, the step of generating image capture device sequence information based on the device information of each image capture device includes: generating image capture device sequence information based on the position information of each image capture device on the traveling route. For example, based on a kilometer post size of each image capture device, device IDs of the image capture devices are ranked from small to large of the kilometer post to generate the image capture device sequence information.

At step S303, taking an image capture device ranking first in the image capture device sequence information as the current image capture device.

The image capture device ranking first in the image capture device sequence information is the image capture device at the train starting position. An image capture device ranking last in the image capture device sequence information is the image capture device at the train terminal position.

In an implementation, before taking the next image capture device as the current image capture device, the automatic train tracking method further includes: determining, based on the image capture device sequence information, an image capture device ranking after and adjacent to the current image capture device as the next image capture device.

According to the automatic train tracking method provided in the embodiments of the present disclosure, firstly, the real-time video image captured by the current image capture device is acquired and displayed; where the plurality of image capture devices are sequentially arranged beforehand in the traveling direction of the train on the traveling route corresponding to the train, and the current image capture device is one of the plurality of image capture devices; then, based on the real-time video image, it is detected whether the train currently enters the capture range of the current image capture device; and finally, when it is detected that the train enters the capture range of the current image capture device, a next image capture device is taken as the current image capture device, and return to the step of acquiring and displaying a real-time video image captured by the current image capture device, where the next image capture device is an image capture device adjacent to the current image capture device in the traveling direction. With the present disclosure, the real-time video image captured by an image capture device that a train is about to pass by or is passing by can be intelligently displayed, automatic tracking of the train can be implemented, and the accuracy of train tracking can be improved. Therefore, the method is suitable for a train command system and can be widely applied to the field of comprehensive video capture of railways.

Figure 4:
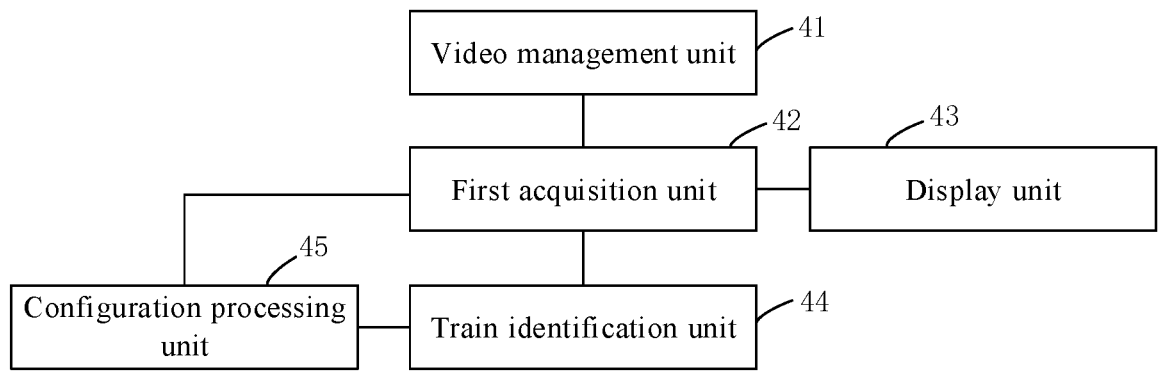
FIG. 4 is a schematic structural diagram of an automatic train tracking system according to an embodiment of the present disclosure.

FIG. 4 is a schematic structural diagram of an automatic train tracking system according to an embodiment of the present disclosure. As shown in FIG. 4, the automatic train tracking system includes: a video management unit 41, a first acquisition unit 42, a display unit 43, a train identification unit 44 and a configuration processing unit 45.

The video management unit 41 is configured to connect and manage a plurality of image capture devices sequentially arranged beforehand in a traveling direction of a train on a traveling route corresponding to the train.

The first acquisition unit 42 is configured to acquire a real-time video image captured by a current image capture device. A plurality of image capture devices are sequentially arranged beforehand in a traveling direction of a train on a traveling route corresponding to the train, and the current image capture device is one of the plurality of image capture devices.

In an implementation, the first acquisition unit 42 is configured to acquire, based on pre-acquired device information of the current image capture device, a real-time video image captured by the current image capture device. Specifically, the first acquisition unit 42, based on pre-acquired device information of the current image capture device, sends a video acquisition request containing device information of the current image capture device to the video management unit 41. In response to the video acquisition request, the video management unit 41 returns the real-time video image captured by the current image capture device to the first acquisition unit 42.

The display unit 43 is configured to display the real-time video image captured by the current image capture device.

In an implementation, the display unit 43 is further configured to display, when it is detected that the train enters a capture range of the current image capture device, a detection result based on the real-time video image in real time.

In an implementation, the automatic train tracking system further includes a decoding unit. The decoding unit is configured to perform format conversion on the real-time video image, and the display unit 43 is configured to display the converted real-time video image.

In an implementation, the display unit 43 includes a first display subunit and a second display subunit. The first display subunit is configured to display a real-time video image which is not subjected to format conversion; and the second display subunit is in communicative connection with the decoding unit, and configured to display the real-time video image which is subjected to the format conversion by the decoding unit. It should be noted that, in order to meet the requirements of different scenarios, the first display subunit and the second display subunit may be located in a same physical device, or in different physical devices.

The train identification unit 44 is configured to detect, based on the real-time video image, whether the train currently enters the capture range of the current image capture device.

In an implementation, the train identification unit 44 is specifically configured to detect the real-time video image through a Single Shot Multibox Detector algorithm to determine whether the train currently enters the capture range of the current image capture device.

The configuration processing unit 45 is configured to configure, when the train identification unit detects that the train enters the capture range of the current image capture device, a next image capture device as the current image capture device, and configure to return to the step of the first acquisition unit acquiring a real-time video image captured by the current image capture device. The next image capture device is an image capture device adjacent to the current image capture device in the traveling direction.

In an implementation, the automatic train tracking system further includes: a second acquisition unit.

The second acquisition unit is configured to acquire device information of each image capture device sequentially arranged in the traveling direction of the train on the traveling route. The device information includes a device ID of the image capture device, and position information of the image capture device on the traveling route.

In an implementation, the configuration processing unit 45 is further configured to generate image capture device sequence information based on the device information of each image capture device. The image capture device sequence information includes a sequence of the image capture devices in which the train is expected to pass by according to the traveling route. The configuration processing unit 45 is further configured to take an image capture device ranking first in the image capture device sequence information as the current image capture device.

In an implementation, the configuration processing unit 45 is configured to configure, based on the image capture device sequence information, an image capture device ranking after and adjacent to the current image capture device as the next image capture device.

It should be noted that the present disclosure is not limited to the specific configurations and processing described in the above embodiments and shown in the figures. For convenience and simplicity of description, detailed description of a known method is omitted here, and for the specific working processes of the system, the modules and the units described above, reference may be made to corresponding processes in the foregoing method embodiments, which are not repeated here.

According to the automatic train tracking system provided in the embodiments of the present disclosure, the first acquisition unit is configured to acquire the real-time video image captured by the current image capture device, the display unit is configured to display the real-time video image; where the plurality of image capture devices are sequentially arranged beforehand in the traveling direction of the train on the traveling route corresponding to the train, and the current image capture device is one of the plurality of image capture devices; the train identification unit is configured to detect, based on the real-time video image, whether the train currently enters the capture range of the current image capture device; and the configuration processing unit is configured to configure, when it is detected that the train enters the capture range of the current image capture device, a next image capture device as the current image capture device, and configured to return to the step of acquiring and displaying a real-time video image captured by the current image capture device, where the next image capture device is configured to be an image capture device adjacent to the current image capture device in the traveling direction. With the automatic train tracking system of the present disclosure, the real-time video image captured by an image capture device that a train is about to pass by or is passing by can be intelligently displayed, automatic tracking of the train can be implemented, and the accuracy of train tracking can be improved. Therefore, the system is suitable for a train command system and can be widely applied to the field of comprehensive video capture of railways.

Figure 5:
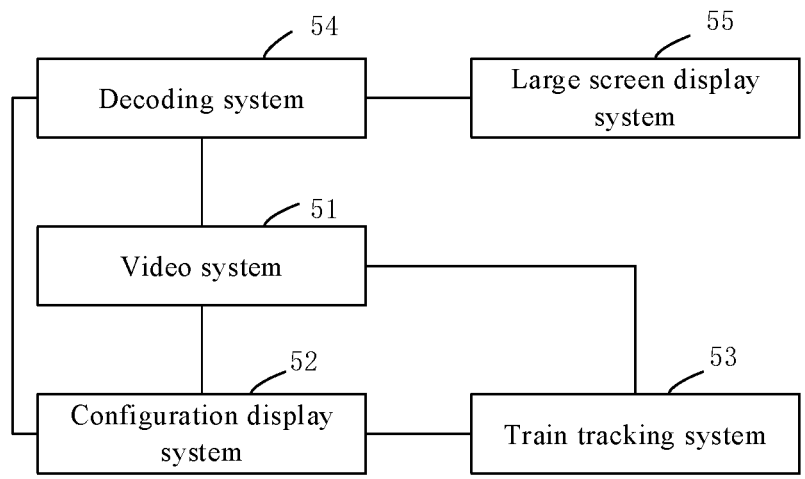
FIG. 5 is a schematic structural diagram of another automatic train tracking system according to an embodiment of the present disclosure.

FIG. 5 is a schematic structural diagram of another automatic train tracking system according to an embodiment of the present disclosure. In an implementation scenario, in order to meet the partitioning requirements of different functional systems, as shown in FIG. 5, the automatic train tracking system provided in this embodiment includes a video system 51, a configuration display system 52, a train tracking system 53, a decoding system 54, and a large screen display system 55. The video management unit, the first acquisition unit, the second acquisition unit, the first display subunit, the second display subunit, the train identification unit, the configuration processing unit, and the decoding unit in the foregoing embodiments may all be configured in different physical systems shown in FIG. 5, and interact with each other.

The video system 51 includes the video management unit and the plurality of image capture devices as described above.

In an implementation, the video system 51 pre-stores device information of each image capture device sequentially arranged in the traveling direction of the train on the traveling route of the train.

The configuration display system 52 includes the first acquisition unit, the second acquisition unit, the first display subunit, and the configuration processing unit.

In an implementation, the configuration display system 52 may employ a Virtual Manufacturing Technology (VMT) system.

The train tracking system 53 includes the first acquisition unit, the train identification unit, and a processing service unit.

In an implementation, the configuration processing unit in the configuration display system 52 is configured to send the device information of the current image capture device to the train tracking system 53, so that the first acquisition unit in the train tracking system 53 acquires, based on pre-acquired device information of the current image capture device, a real-time video image captured by the current image capture device, and then, the train identification unit detects, based on the real-time video image, whether the train currently enters the capture range of the current image capture device. The processing service unit is configured to send the detection result from the train identification unit to the configuration display system 52, so that the configuration processing unit in the configuration display system 52 performs corresponding configuration operation based on the detection result. For example, when the detection result indicates that the train enters the capture range of the current image capture device, the configuration processing unit configures a next image capture device as the current image capture device, and configures to return to the step of the first acquisition unit acquiring a real-time video image captured by the current image capture device.

The decoding system 54 includes the first acquisition unit and the decoding unit.

In an implementation, the configuration processing unit in the configuration display system 52 is configured to send the device information of the current image capture device to the decoding system 54, so that the first acquisition unit in the decoding system 54 acquires, based on pre-acquired device information of the current image capture device, a real-time video image captured by the current image capture device, and then the decoding unit performs format conversion on the real-time video image. The decoding unit is further configured to send the decoded real-time video image to the large screen display system 55.

The large screen display system 55 includes the second display subunit configured to display the converted real-time video image.

The above embodiments are only used for illustrating the present disclosure, where the structure, connection manner, manufacturing process and the like of each component can be changed, and equivalent changes and improvements made on the basis of the technical solution of the present disclosure should not be excluded from the protection scope of the present disclosure.

What is claimed is:

1. An automatic train tracking method, characterized in that the automatic train tracking method comprises:
    acquiring and displaying a real-time video image captured by a current image capture device; wherein a plurality of image capture devices are sequentially arranged beforehand in a traveling direction of a train on a traveling route corresponding to the train, and the current image capture device is one of the plurality of image capture devices;
    detecting, based on the real-time video image, whether the train currently enters a capture range of the current image capture device; and
    taking, when it is detected that the train enters the capture range of the current image capture device, a next image capture device as the current image capture device, and returning to the step of acquiring and displaying a real-time video image captured by the current image capture device, wherein the next image capture device is an image capture device adjacent to the current image capture device in the traveling direction.

2. The automatic train tracking method according to claim 1, characterized in that before acquiring and displaying the real-time video image captured by the current image capture device, the automatic train tracking method further comprises:
    acquiring device information of each image capture device sequentially arranged in the traveling direction of the train on the traveling route, wherein the device information comprises a device ID of the image capture device, and position information of the image capture device on the traveling route;
    generating image capture device sequence information based on the device information of each image capture device, wherein the image capture device sequence information comprises a sequence of the image capture devices in which the train is expected to pass by according to the traveling route; and
    taking an image capture device ranking first in the image capture device sequence information as the current image capture device.

3. The automatic train tracking method according to claim 2, characterized in that before taking the next image capture device as the current image capture device, the automatic train tracking method further comprises:
    determining, based on the image capture device sequence information, an image capture device ranking after and adjacent to the current image capture device as the next image capture device.

4. The automatic train tracking method according to claim 1, characterized in that the step of detecting, based on the real-time video image, whether the train currently enters the capture range of the current image capture device comprises:
    detecting the real-time video image through a Single Shot Multibox Detector algorithm to determine whether the train currently enters the capture range of the current image capture device.

5. The automatic train tracking method according to claim 1, characterized in that the automatic train tracking method further comprises:
    displaying, when it is detected that the train enters the capture range of the current image capture device, a detection result based on the real-time video image in real time.

6. The automatic train tracking method according to claim 1, characterized in that the step of acquiring and displaying a real-time video image captured by the current image capture device comprises:
    acquiring, based on pre-acquired device information of the current image capture device, a real-time video image captured by the current image capture device; and
    performing format conversion on the real-time video image, and displaying the converted real-time video image.

7. An automatic train tracking system, characterized in that the automatic train tracking system comprises:
    a first acquisition unit configured to acquire a real-time video image captured by a current image capture device; wherein a plurality of image capture devices are sequentially arranged beforehand in a traveling direction of a train on a traveling route corresponding to the train, and the current image capture device is one of the plurality of image capture devices;
    a display unit configured to display the real-time video image captured by the current image capture device;
    a train identification unit configured to detect, based on the real-time video image, whether the train currently enters a capture range of the current image capture device; and
    a configuration processing unit configured to configure, when the train identification unit detects that the train enters the capture range of the current image capture device, a next image capture device as the current image capture device, and configure to return to the step of the first acquisition unit acquiring a real-time video image captured by the current image capture device, wherein the next image capture device is an image capture device adjacent to the current image capture device in the traveling direction.

8. The automatic train tracking system according to claim 7, characterized in that the automatic train tracking system further comprises: a second acquisition unit; wherein
    the second acquisition unit is configured to acquire device information of each image capture device sequentially arranged in the traveling direction of the train on the traveling route, wherein the device information comprises a device ID of the image capture device, and position information of the image capture device on the traveling route; and
    the configuration processing unit is further configured to generate image capture device sequence information based on the device information of each image capture device, wherein the image capture device sequence information comprises a sequence of the image capture devices in which the train is expected to pass by according to the traveling route; and is further configured to take an image capture device ranking first in the image capture device sequence information as the current image capture device.

9. The automatic train tracking system according to claim 8, characterized in that the configuration processing unit is further configured to configure, based on the image capture device sequence information, an image capture device ranking after and adjacent to the current image capture device as the next image capture device.

10. The automatic train tracking system according to claim 7, characterized in that the train identification unit is configured to detect the real-time video image through a Single Shot Multibox Detector algorithm to determine whether the train currently enters the capture range of the current image capture device.

11. The automatic train tracking system according to claim 7, characterized in that the display unit is configured to display, when it is detected that the train enters the capture range of the current image capture device, a detection result based on the real-time video image in real time.

12. The automatic train tracking system according to claim 7, characterized in that the automatic train tracking system further comprises a decoding unit;
    the first acquisition unit is configured to acquire, based on pre-acquired device information of the current image capture device, the real-time video image captured by the current image capture device; and
    the decoding unit is configured to perform format conversion on the real-time video image; and
    the display unit is configured to display the converted real-time video image.

\* \* \* \* \*